(12) United States Patent
Painter

(10) Patent No.: US 10,563,778 B2
(45) Date of Patent: Feb. 18, 2020

(54) MULTI-WELL FRACTURING PADS USING SHUTTLE VALVES

(71) Applicant: Chevron U.S.A. Inc., San Ramon, CA (US)

(72) Inventor: Jay Patrick Painter, League City, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 149 days.

(21) Appl. No.: 15/883,523

(22) Filed: Jan. 30, 2018

(65) Prior Publication Data
US 2019/0234520 A1 Aug. 1, 2019

(51) Int. Cl.
*F16K 11/065* (2006.01)
*E21B 43/26* (2006.01)
*E21B 34/00* (2006.01)

(52) U.S. Cl.
CPC .......... *F16K 11/0655* (2013.01); *E21B 34/00* (2013.01); *E21B 43/26* (2013.01)

(58) Field of Classification Search
CPC ....... F16K 11/0655; E21B 34/00; E21B 43/26
USPC ...................................................... 66/308.1
See application file for complete search history.

(56) References Cited

U.S. PATENT DOCUMENTS

| | | | | |
|---|---|---|---|---|
| 3,683,966 A * | 8/1972 | Payne | ................ | F16K 11/0655 137/625.48 |
| 3,773,438 A * | 11/1973 | Hall | ....................... | E21B 43/26 417/345 |
| 2007/0128053 A1* | 6/2007 | Stamper | .................. | F04B 9/133 417/397 |
| 2010/0010721 A1* | 1/2010 | Van Vactor | ............. | F01D 21/02 701/100 |
| 2016/0115773 A1* | 4/2016 | Conrad | ................... | E21B 43/26 166/308.1 |
| 2017/0198548 A1* | 7/2017 | Dickinson | ............... | E21B 43/26 |
| 2017/0275980 A1* | 9/2017 | Kajaria | ................. | E21B 33/068 |
| 2017/0370172 A1* | 12/2017 | Tran | ..................... | E21B 33/038 |
| 2018/0179848 A1* | 6/2018 | Cherewyk | ............. | E21B 33/068 |

* cited by examiner

*Primary Examiner* — Anna M Momper
*Assistant Examiner* — Patrick F Lambe
(74) *Attorney, Agent, or Firm* — King & Spalding LLP

(57) ABSTRACT

A multi-well pad for fracturing a subterranean formation can include a valve assembly that includes a shuttle valve, an inlet, a first outlet, and a second outlet, where the inlet is coupled to a fracturing pump, where the first outlet is coupled to a first well, where the second outlet is coupled to a second well, where first shuttle valve has a first position and a second position. The fracturing pump and the first well can form a continuous first path through the valve assembly while closing off a second path between the fracturing pump and the second well when the shuttle valve is in the first position. The fracturing pump and the second well can form a continuous second path through the valve assembly while closing off the first path between the fracturing pump and the first well when the shuttle valve is in the second position.

20 Claims, 11 Drawing Sheets

MULTI-WELL FRACTURING PADS USING SHUTTLE VALVES

TECHNICAL FIELD

The present disclosure relates generally to apparatus, systems, and methods of fracturing a multi-well pad using shuttle valves.

BACKGROUND

It is very common to use a manifold system for efficiency when completing stimulation activity on a multiple well pad in connection with hydraulic fracturing at a drilling site. Typical manifold systems are intrinsically connected where high pressure sections are isolated by a valve or other pressure controlling mechanism. The fracturing fluid supply, provided by fracturing trucks for example, is pumped into a connector. The connector is connected to a fracturing manifold which takes the fracturing fluid input and outputs one line per well on the well pad. Each well is isolated from the manifold by a valve and additional valves may be found in the manifold itself. When fracturing, every valve should be closed, except for the valves leading to the well to be fractured.

Further, when using a manifold, if a valve fails while fracturing through a manifold, other sections of the manifold may become unintentionally pressurized leading to no go zones and slowing the rate at which the well can go into production. As such, when actively fracturing a well, an exclusion zone exists around a well pad such that no other workover operations, such as perforation and plugging, can be performed on other wells in the pad. The exclusion zone requirement increases the time needed to fracture all zones, reducing the overall efficiency of the fracturing job.

SUMMARY

In general, in one aspect, the disclosure relates to a multi-well fracturing pad for fracturing a subterranean formation. The multi-well fracturing pad can include a first valve assembly having a first shuttle valve, a first inlet, a first outlet, and a second outlet, where the first inlet is coupled to a fracturing pump, where the first outlet is coupled to a first well, where the second outlet is coupled to a second well, where the first shuttle valve has a first position and a second position. The fracturing pump and the first well can form a continuous first path through the first valve assembly when the first shuttle valve is in the first position. The fracturing pump and the second well can be closed off from each other by the first shuttle valve when the first shuttle valve is in the first position. The fracturing pump and the second well can form a continuous second path through the first valve assembly when the first shuttle valve is in the second position. The fracturing pump and the first well can be closed off from each other by the first shuttle valve when the first shuttle valve is in the second position.

In another aspect, the disclosure can generally relate to a method for fracturing a subterranean formation using a multi-well fracturing pad. The method can include operating, prior to fracturing a first well, at least one shuttle valve of the multi-well pad to form a first configuration, where the first configuration of the at least one shuttle valve forms a continuous first path between a fracturing pump and the first well while closing off the fracturing pump from a first reminder of wells. The method can also include operating, after fracturing the first well and prior to fracturing a second well, the at least one shuttle valve of the multi-well pad to form a second configuration, where the second configuration of the at least one shuttle valve forms a continuous second path between a fracturing pump and the second well while closing off the fracturing pump from a second reminder of wells.

These and other aspects, objects, features, and embodiments will be apparent from the following description and the appended claims.

BRIEF DESCRIPTION OF THE DRAWINGS

The drawings illustrate only example embodiments of methods, systems, and devices for multi-well fracturing pads using shuttle valves and are therefore not to be considered limiting of its scope, as they may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1:
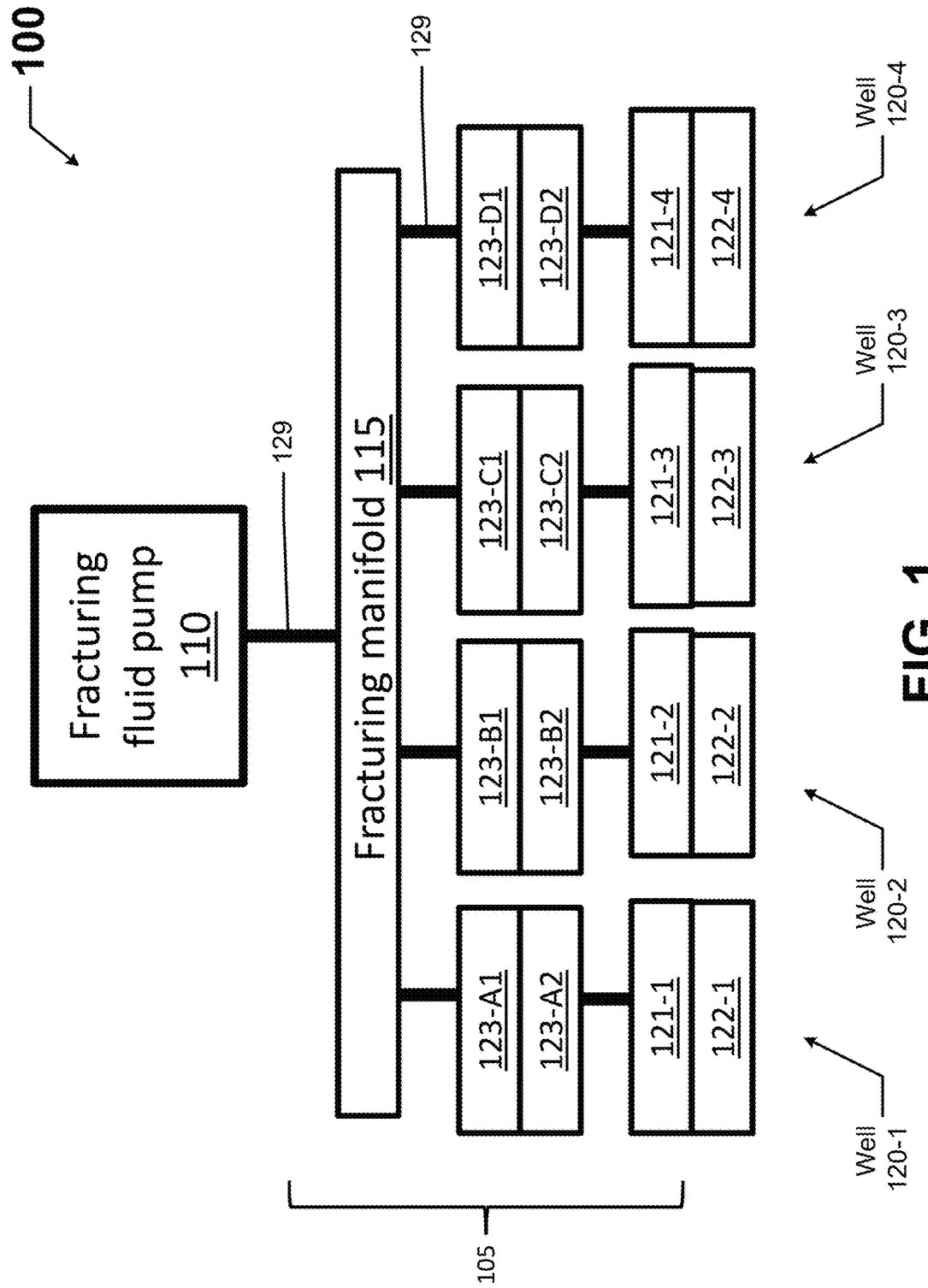
FIG. 1 shows a prior art field system for fracturing a multi-well pad.

The example embodiments discussed herein are directed to systems, apparatus, and methods of multi-well fracturing pads using shuttle valves. Example embodiments of the disclosure will be described more fully hereinafter with reference to the accompanying drawings, in which example embodiments of apparatus, methods, and systems for multi-well fracturing pads using shuttle valves are illustrated. The apparatus, systems, and methods may, however, be embodied in many different forms and should not be construed as limited to the example embodiments set forth herein. Rather, these example embodiments are provided so that this disclosure will be thorough and complete, and will fully convey the scope of the systems, methods, and apparatus to those of ordinary skill in the art. Like, but not necessarily the same, elements in the various figures are denoted by like reference numerals for consistency.

In certain example embodiments, field systems that include example embodiments are subject to meeting certain standards and/or requirements. For example, the American Petroleum Institute (API), the International Standards Organization (ISO), and the Occupational Health and Safety Administration (OSHA) set standards for field operations such as fracturing. Use of example embodiments described herein meet (and/or allow a corresponding field system to meet) such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of multi-well fracturing pads using shuttle valves will be described more fully hereinafter with reference to the accompanying drawings, in which example embodiments of multi-well fracturing pads using shuttle valves are shown. Multi-well fracturing pads using shuttle valves may, however, be embodied in many different forms and should not be construed as limited to the example embodiments set forth herein. Rather, these example embodiments are provided so that this disclosure will be thorough and complete, and will fully convey the scope of multi-well fracturing pads using shuttle valves to those of ordinary skill in the art. Like, but not necessarily the same, elements (also sometimes called components) in the various figures are denoted by like reference numerals for consistency.

Terms such as "first," "second," "end," "inner," "outer," "distal," and "proximal" are used merely to distinguish one component (or part of a component or state of a component) from another. Such terms are not meant to denote a preference or a particular orientation. Also, the names given to various components described herein are descriptive of one embodiment and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment. "About," and "substantially," as used herein prior to a number, refers to an amount that is within 3 percent of the number listed. A "plurality," as used herein, refers to two or more.

"Connected," as used herein, refers to directly or indirectly connecting two pipes to form a conduit, i.e. the two pipes can be directly attached (for example, threaded together), attached through a joint, or there can be other pipes between the two pipes as long as they can form a single conduit between the two pipes.

"Attached," as used herein, refers to connecting two pipes through a direct connection, a valve, or a joint to form a conduit, in other words, there are no other pipes between the two pipes.

"Pipe," as used herein, refers to a hollow tube with attachment points on either end, the tube may be straight or curved and the pipe may be of an adjustable length. Line and conduit are used throughout interchangeably.

"Frac," or "fracing" as used herein, is short for fracturing, which is a process by which targeted areas of a subterranean formation are fractured in an effort to extract additional resources from the subterranean formation. A fracturing operation can also be called "fracing".

FIG. 1 illustrates a common set up of a fracturing system 100 of the prior art in a multi-well fracturing pad 105 that includes four wells 120 (well 120-1, 120-2, well 120-3, and well 120-4). Each well 120 in such a multi-well fracturing pad 105 (also called a multi-well pad 105) can get fractured multiple times. Each well 120 of the fracturing system 100 can have any of a number (e.g., 4, 40, 100) of fracturing zones within that well 120. The fracturing pump 110 operates to deliver the fracturing medium (e.g., a liquid) through a fracturing manifold 115 of the multi-well pad 105 to the wells 120.

Each well 120 has one or more of a number of components associated with it. For example, in this case, each well 120 has a wellbore 122, atop of which is a fracturing tree 121, atop of which are one or more (in this case, two) valves 123. Specifically in this example, associated with well 120-1 is wellbore 122-1, fracturing tree 121-1, valve 123-A1, and valve 123-A2. Associated with well 120-2 is wellbore 122-2, fracturing tree 121-2, valve 123-B1, and valve 123-B2. Associated with well 120-3 is wellbore 122-3, fracturing tree 121-3, valve 123-C1, and valve 123-C2. Associated with well 120-4 is wellbore 122-4, fracturing tree 121-4, valve 123-D1, and valve 123-D2. The valves 123 can be considered part of the multi-well pad 105.

Pipes 129 are used to deliver the fluid used during fracturing between the fracturing pump 110, the fracturing manifold 105, the valves 123, the trees 121, and the wellbores 122. The fracturing trees 121 within a pad are usually about evenly spaced. However, variations between fracturing trees 121 can occur. For example, the spacing between adjacent fracturing trees 121 can vary by a couple of feet, the elevation of each fracturing tree 121 relative to the other can vary by a couple of feet, and the angle of the fracturing trees 121 to the wellbore 122 can vary by a few degrees.

As a result, connecting a valve 123 to a fracturing tree 121 can be complex and require multiple lines, multiple swivel joints, and/or expandable pipes, each individually adjusted, in order to properly connect the fracturing manifold 115 to each fracturing tree 121 in the multi-well pad 105. These connections tend to have 6 or more connectors or "legs" per connection from the fracturing manifold 115 to a fracturing tree 121 in order to generate the number of degrees of freedom needed to properly connect the fracturing manifold 115 to the fracturing trees 121.

When fracturing occurs, the fracturing operation is applied to one well 120 at a time. Before a fracturing operation begins, a single well 120 (e.g., well 120-3) is isolated so that the well 120 is the only one among all of the wells 120 in the system 100 with a continuous (unblocked) path to the fracturing pump 110. This occurs by operating the various valves 123. For example, valve 123-A1, valve 123-A2, valve 123-B1, valve 123-B2, valve 123-D1, and valve 123-D2 are closed while valve 123-C1 and valve 123-C2 are opened, effectively isolating well 120-1, well 120-2, and well 120-4 from the fracturing operation. Once well 120-3 is fractured, valve 123-C1 and valve 123-C2 are closed, and valves 123 from one of the other wells 120 are opened, allowing the next fracturing operation to proceed on the newly-isolated well. This process is repeated cycling through each well 120.

When the number of wells 120 is large, the number of valves 123 in the multi-well pad 105 can be very large. Further, in such a case, the layout of the multi-well pad 105 and its various components can be difficult to track, making verification that a single identified well 120 is properly isolated before beginning a fracturing operation difficult.

Put another way, the existing fracturing manifold 115 designs require many adjustable connecting components (e.g., valves 123) in order to provide the required number of degrees of freedom for the fracturing manifold 115. Further, using a fracturing manifold 115 leads to the potential for an unintended well 120 to become pressurized. Example embodiments described below provide a solution that allows for the same degrees of freedom with fewer connecting components and visual verification for each configuration of valves to ensure that only a single well has an open path to the fracturing pump. Further, the current disclosure provides a system that removes the need for exclusion zones as it does not include a fracturing manifold 115. The design of the current disclosure leads to more efficient and safer fracturing operations.

Figure 2:
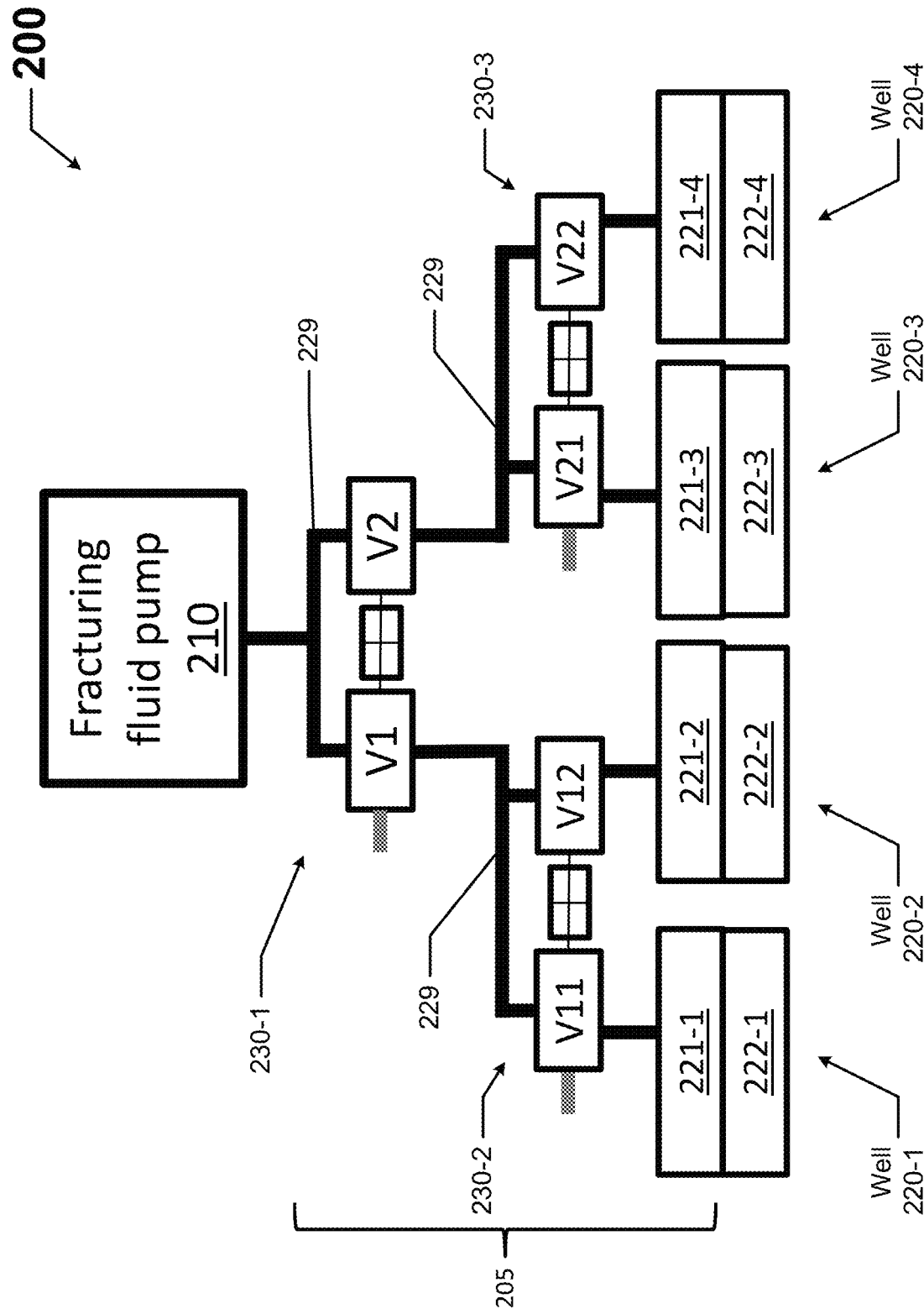
FIG. 2 shows a field system that includes multiple wells and a multi-well pad in accordance with certain example embodiments.

FIG. 2 shows a field system 200 that includes multiple wells 220 and a multi-well fracturing pad 205 in accordance with certain example embodiments. Referring to FIGS. 1 and 2, the system 200 of FIG. 2 is substantially the same as the system 100 of FIG. 1, except as described below. For example, as with the system 100 of FIG. 1, the system 200 of FIG. 2 has four wells 220 (well 220-1, well 220-2, well 220-3, and well 220-4). Each well 220 includes a fracturing tree 221 and a wellbore 222. So, in this case, well 220-1 includes fracturing tree 221-1 and wellbore 222-1, well 220-2 includes fracturing tree 221-2 and wellbore 222-2, well 220-3 includes fracturing tree 221-3 and wellbore 222-3, and well 220-4 includes fracturing tree 221-4 and wellbore 222-4. The system 200 also includes a fracturing pump 210, and a number of pipes 229 that transmit the fluid from the fracturing pump 210 to the various wells 220.

However, the multi-well pad 205 of the system 200 of FIG. 2 does not include a fracturing manifold. Also, the valve assemblies 230 in this case include shuttle valves. Also, when a system 200 has multiple valve assemblies 230, as in this case, the valve assemblies 230 are arranged in a tiered configuration. In other words, there are fewer valve assemblies 230 (in this case, three) than there are wells 220 (in this case, four). The configurations of the valve assemblies 230 relative to each other can vary. For example, if there are n wells 220, there can be n−1 valve assemblies 230. Details of an example valve assembly 230 are provided below with respect to FIG. 3.

Valve assembly 230-1 is connected directly to the fracturing pump 210 by pipes 229. Valve assembly 230-2 is connected directly to valve V1 of valve assembly 230-1 using pipes 229. Similarly, valve assembly 230-2 is connected directly to valve V2 of valve assembly 230-1 using pipes 229. Valve V11 of valve assembly 230-2 feeds fracturing tree 221-1 and wellbore 222-1 of well 220-1. Valve V12 of valve assembly 230-2 feeds fracturing tree 221-2 and wellbore 222-2 of well 220-2. Valve V21 of valve assembly 230-3 feeds fracturing tree 221-3 and wellbore 222-3 of well 220-3. Valve V22 of valve assembly 230-3 feeds fracturing tree 221-4 and wellbore 222-4 of well 220-4.

As described above, each of the valve assemblies 230 are identical to each other and include a shuttle valve. As such, each shuttle valve of a valve assembly 230 includes two valves that operate simultaneously. In this example, the shuttle valves of the valve assemblies 230 of FIG. 2 are 2-way shuttle valves. In this way, when one valve (e.g., valve V1) of the shuttle valve of a valve assembly 230 (e.g., valve assembly 230-1) is open, the other valve (e.g., valve V2) of the shuttle valve of the valve assembly is closed. In this way, when the valve assemblies 230 are operated, only a single path (in this case, from the fracturing pump 210 to well 220-1) is open, and all other paths (in this case, from the fracturing pump 210 to well 220-2, from the fracturing pump 210 to well 220-3, and from the fracturing pump 210 to well 220-4) are closed.

Figure 3:
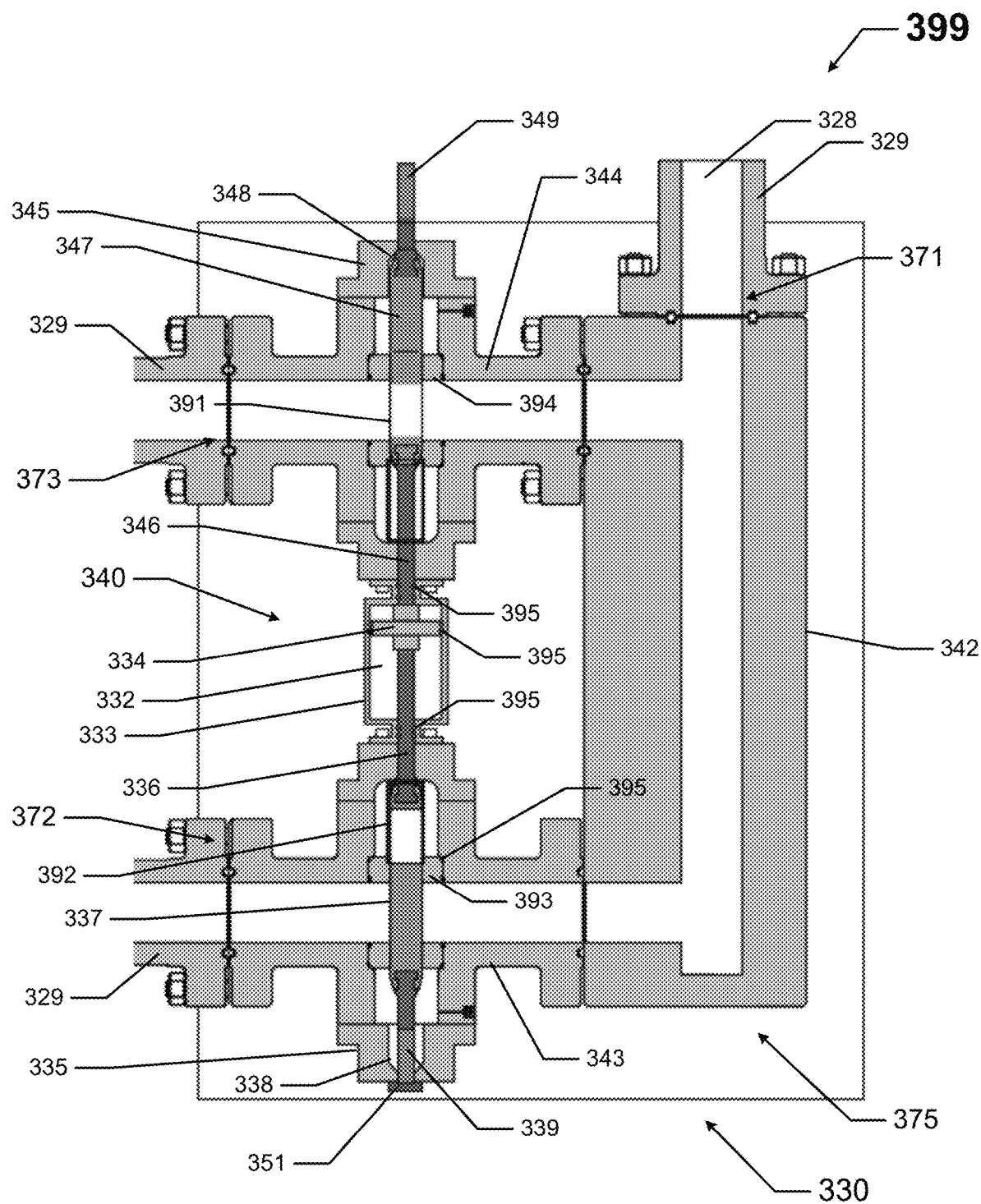
FIG. 3 shows a fracturing manifold subsystem for fracturing a multi-well field that includes a shuttle valve in accordance with certain example embodiments.

FIG. 3 shows a fracturing manifold subsystem 399 (part of a fracturing pad, such as fracturing pad 205 of FIG. 2) for fracturing a multi-well field that includes valve assembly 330 having a shuttle valve 340 in accordance with certain example embodiments. Referring to FIGS. 1-3, in addition to the shuttle valve 340, the valve assembly 330 includes an inlet 371 and two outlets (outlet 372 and outlet 373). The valve assembly 330 has a body 375 that can be made from one or more pieces. In this case, the body 375 of the valve assembly 330 is made from 3 pieces that are coupled (e.g., bolted) to each other. Further, the body 375 of the valve assembly 330 can have any of a number of configurations. For example, in this case, the body 375 of the valve assembly 330 forms a U-shape.

Piece 342 of the body 375 of the valve assembly 330 acts as a type of header (the base of the U-shape). Piece 343 and piece 344 are configured identically to each other and act as the legs of the U-shape of the body 375. As such, piece 343 is coupled to one end of piece 342, and piece 344 is coupled to the other end of piece 342. There is a channel 328 that runs through the middle of the body 375 and its various pieces (piece 342, piece 343, piece 344).

The inlet 371 of the valve assembly 330 is part of piece 342 and forms a first end of the channel 328 disposed in the body 375 of the valve assembly 330. The outlet 372 of the valve assembly 330 is part of piece 343 and forms a second end of the channel 328 disposed in the body 375 of the valve assembly 330. The outlet 373 of the valve assembly 330 is part of piece 344 and forms a third end of the channel 328 disposed in the body 375 of the valve assembly 330.

The shuttle valve 340 in this case is disposed within and between piece 343 and piece 344 of the body 375 of the valve assembly 330. The shuttle valve 340 includes an actuator 334, a valve stem 337 coupled to one end of the actuator 334, and another valve stem 347 coupled to the opposite end of the actuator 334. The actuator 334 is movably disposed within a cavity 332 formed by an actuator housing 333. Specifically, the actuator 334 moves (shuttles) between either end of the actuator housing 333. In some cases, there is one or more sealing devices 395 (e.g., o-ring, gasket) disposed around the actuator 334. The actuator 334 can move within the actuator housing 333 electrically, magnetically, pneumatically, and/or by some other means (e.g., compressed air).

Directly coupled to each end of the actuator 334 is an extension. Specifically, extension 336 is directly coupled to one end of the actuator 334, and extension 346 is directly coupled to the other end of the actuator 334. Extension 336 is, in turn, directly coupled to valve stem 337, and extension 346 is, in turn, directly coupled to valve stem 347. Valve stem 337 has an aperture 392 that traverses through a portion of the valve stem 337, and valve stem 347 has an aperture 391 that traverses through a portion of the valve stem 347.

The aperture 392 in the valve stem 337 and the aperture 391 in the valve stem 347 can have a number of shapes and sizes. For example, aperture 392 and aperture 391 can be substantially the same shape and size as the channel 328 in the body 375 of the valve assembly 330. In this way, since the shuttle valve 340 is a 2-way valve, when the actuator 334 is in one position within the actuator housing 333, one valve stem (e.g., valve stem 337) can be disposed in the channel 328, thereby completely blocking the channel 328 between the inlet 371 and the corresponding outlet (e.g., outlet 372), while the aperture (e.g., aperture 391) of the other valve stem (e.g., valve stem 347) can be disposed in the channel 328, thereby allowing a continuous path along the channel 328 between the inlet 371 and the corresponding outlet (e.g., outlet 373).

Conversely, when the actuator 334 shifts to the other position within the actuator housing 333, the valve stem (e.g., valve stem 337) that was disposed in the channel 328 now has its aperture (e.g., aperture 392) disposed in the channel, thereby allowing a continuous path along the channel 328 between the inlet 371 and the corresponding outlet (e.g., outlet 372), while the other valve stem (e.g., valve stem 347) becomes disposed in the channel 328, thereby completely blocking the channel 328 between the inlet 371 and the corresponding outlet (e.g., outlet 373).

Regardless of the position of the actuator 334 (and so also the shuttle valve 330), the distal end of each valve stem (in this case, valve stem 337 and valve stem 347) extends beyond the channel 328. Attached to the distal end of valve stem 337 is a valve position indicator 339, and attached to the distal end of valve stem 347 is a valve position indicator 349. Valve position indicator 339 is designed to protrude through an aperture in an end cap 335 coupled to piece 343 when the aperture 392 of the valve stem 337 is disposed in the channel 328, allowing a continuous path between inlet 371 and outlet 372. In other words, when the valve position indicator 339 is visible, a user has a visual confirmation that the valve stem 337 is open along that channel 328. When the valve position indicator 339 is hidden within the end cap 335, as shown in FIG. 3, this indicates that the valve stem 337 is blocking the channel 328 between the inlet 371 and outlet 372.

Similarly, as shown in FIG. 3, valve position indicator 349 is designed to protrude through an aperture in an end cap 345 coupled to piece 344 when the aperture 391 of the valve stem 347 is disposed in the channel 328, allowing a continuous path between inlet 371 and outlet 373. In other words, when the valve position indicator 349 is visible, a user has a visual confirmation that the valve stem 347 is open along that channel 328. When the valve position indicator 349 is hidden within the end cap 335, this indicates that the valve stem 347 is blocking the channel 328 between the inlet 371 and outlet 373.

In certain example embodiments, one or more additional safety features can be integrated with an example valve assembly 330. For example, as shown in FIG. 3, a mechanical lockout 351 can be used to keep the shuttle valve 340 in a certain position and/or to prevent the shuttle valve 340 from moving to a different position. In this case, the mechanical lockout 351 is coupled to the end cap 335 and prevents the valve stem 337 (and so the actuator 334) from moving downward.

One or more retainers 393 can be used to properly align the valve stem 337. Such retainers 393 can also maintain the integrity of the channel 329 around the valve stem 337. One or more sealing devices 395 (e.g., o-rings, gaskets) can be used in conjunction with one or more retainers 393 to keep fluids in the channel 328. Similarly, one or more retainers 394 can be used to properly align the valve stem 347. Such retainers 394 can also maintain the integrity of the channel 329 around the valve stem 347. One or more sealing devices 395 (e.g., o-rings, gaskets) can be used in conjunction with one or more retainers 394 to keep fluids in the channel 328. As appropriate, one or more other sealing devices 395 can be used in conjunction with other portions of the shuttle valve 340.

The end cap 335 can have an inner surface 338 that complements the shape and size of the distal end of the valve stem 337. Under this arrangement, the end cap 335 can act as a stop for the valve stem 337 so that the aperture 392 of the valve stem 337 can be properly centered in the channel 328. Similarly, the end cap 345 can have an inner surface 348 that complements the shape and size of the distal end of the valve stem 347, as shown in FIG. 3. Under this arrangement, the end cap 345 can act as a stop for the valve stem 347 so that the aperture 391 of the valve stem 347 can be properly centered in the channel 328.

Figure 4:
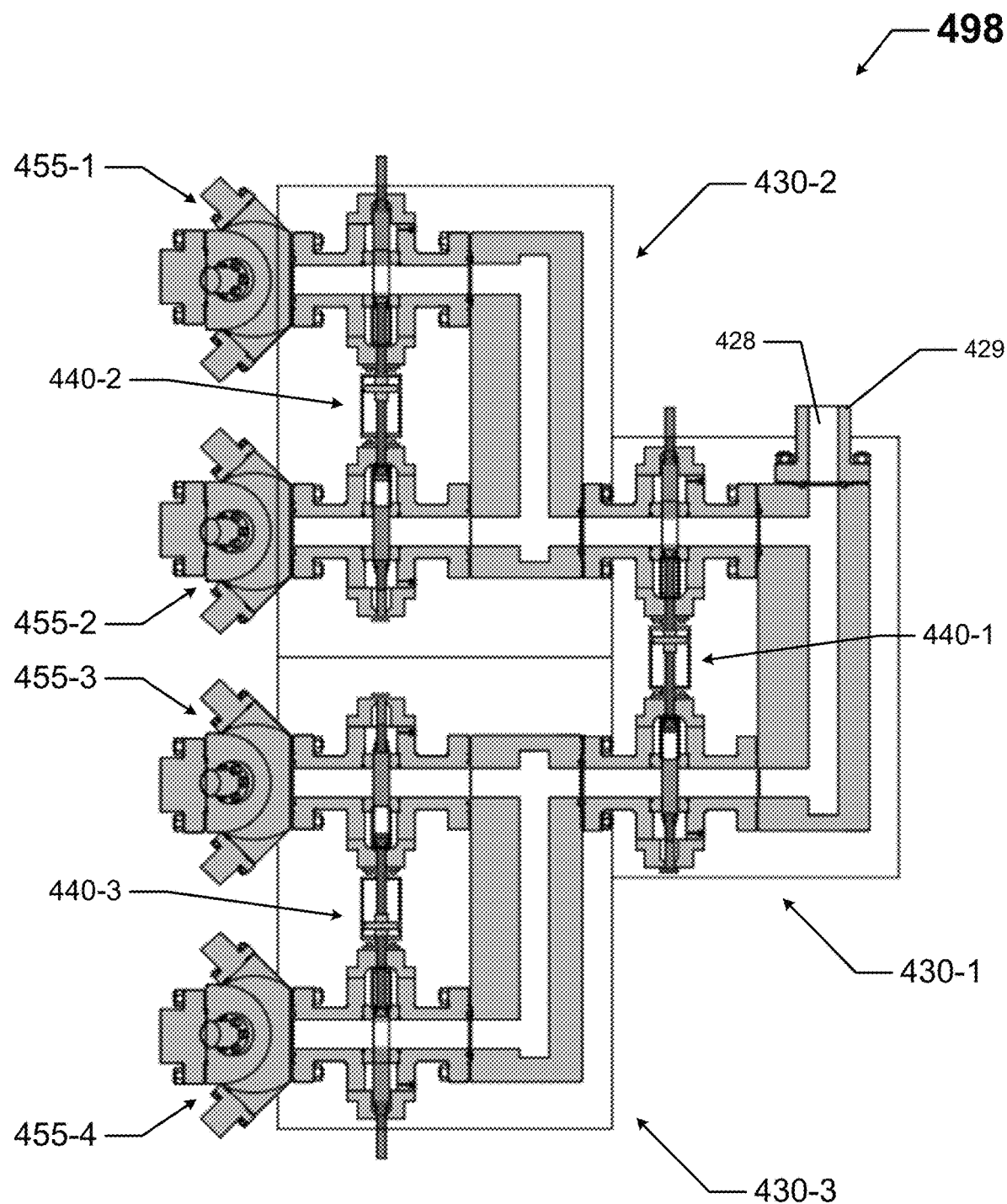
FIG. 4 shows another fracturing manifold subsystem for fracturing a multi-well field that includes multiple shuttle valves in accordance with certain example embodiments.

FIG. 4 shows another fracturing manifold subsystem 498 (part of a fracturing pad, such as fracturing pad 205 of FIG. 2) for fracturing a multi-well field that includes multiple shuttle valve assemblies 430 in accordance with certain example embodiments. Referring to FIGS. 1-4, the subsystem 498 of FIG. 4 has three valve assemblies 430 (valve assembly 430-1, valve assembly 430-2, and valve assembly 430-3) coupled to each other in a tiered configuration. Each valve assembly 430 of FIG. 4 is substantially the same as the valve assembly 330 described above with respect to FIG. 3. For example, valve assembly 430-1 includes a shuttle valve 440-1, valve assembly 430-2 includes a shuttle valve 440-2, and valve assembly 430-3 includes a shuttle valve 440-3.

The input of valve assembly 430-1 is directly coupled to a pipe 429 that leads to a fracturing pump (e.g., fracturing pump 210). One output of valve assembly 430-1 is directly coupled to the input of valve assembly 430-2, while the other output of valve assembly 430-1 is directly coupled to the input of valve assembly 430-3. The two outputs of valve assembly 430-2 feed two wells, and the two outputs of valve assembly 430-3 feed another two wells. Specifically, the two outputs of valve assembly 430-2 are coupled to fracturing iron 455-1 and fracturing iron 455-2, which in turn are each coupled to a fracturing tree for each respective well. Further, the two outputs of valve assembly 430-3 are coupled to fracturing iron 455-3 and fracturing iron 455-4, which in turn are each coupled to a fracturing tree for each respective well.

Based on the configuration of the shuttle valves 440 shown in FIG. 4, there is an open path through the channel leading from the pipe 429 at the input of valve assembly 430-1 to the fracturing iron 455-1 at one of the outputs of valve assembly 430-2. Likewise, the channels from the pipe 429 at the input of valve assembly 430-1 to fracturing iron 455-2, fracturing iron 455-3, and fracturing iron 455-4 are blocked by the shuttle valves 440.

Figure 5:
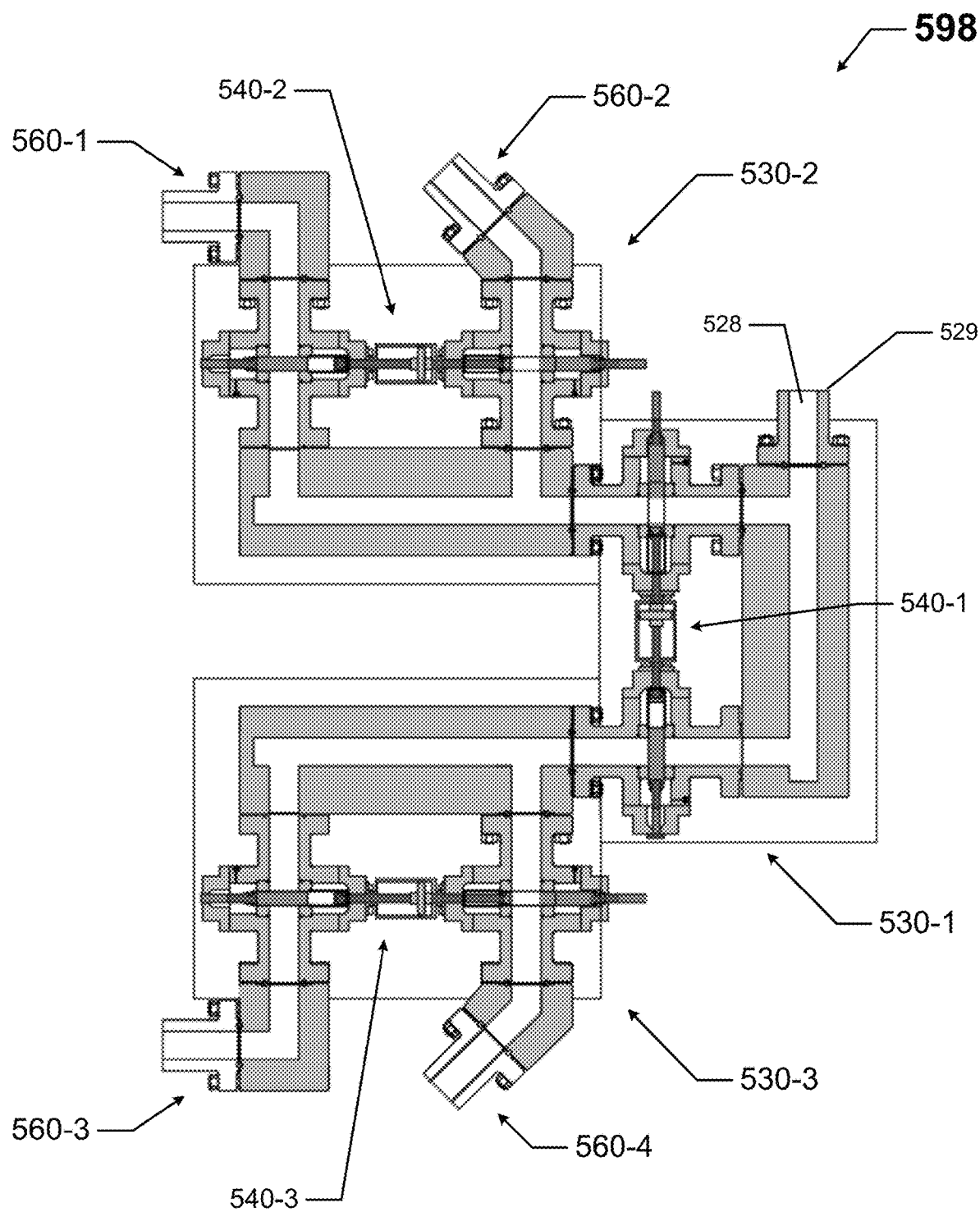
FIG. 5 shows yet another fracturing manifold subsystem for fracturing a multi-well field that includes multiple shuttle valves in accordance with certain example embodiments.

FIG. 5 shows yet another fracturing manifold subsystem 598 (part of a fracturing pad, such as fracturing pad 205 of FIG. 2) for fracturing a multi-well field that includes multiple valve assemblies 530 in accordance with certain example embodiments. Referring to FIGS. 1-5, the subsystem 598 of FIG. 5 has three valve assemblies 530 (valve assembly 530-1, valve assembly 530-2, and valve assembly 530-3) coupled to each other in a tiered configuration. Each valve assembly 530 of FIG. 5 is substantially the same as the valve assembly 330 described above with respect to FIG. 3. For example, valve assembly 530-1 includes a shuttle valve 540-1, valve assembly 530-2 includes a shuttle valve 540-2, and valve assembly 530-3 includes a shuttle valve 540-3.

The input of valve assembly 530-1 is directly coupled to a pipe 529 that leads to a fracturing pump (e.g., fracturing pump 210). One output of valve assembly 530-1 is directly coupled to the input of valve assembly 530-2, while the other output of valve assembly 530-1 is directly coupled to the input of valve assembly 530-3. The two outputs of valve assembly 530-2 feed two wells, and the two outputs of valve assembly 530-3 feed another two wells. Specifically, the two outputs of valve assembly 530-2 are coupled to single line unit 560-1 and single line unit 560-2, which in turn are each coupled to a fracturing tree for each respective well. Further, the two outputs of valve assembly 530-3 are coupled to single line unit 560-3 and single line unit 560-4, which in turn are each coupled to a fracturing tree for each respective well.

Based on the configuration of the shuttle valves 540 shown in FIG. 5, there is an open path through the channel leading from the pipe 529 at the input of valve assembly 530-1 to the single line unit 560-2 at one of the outputs of valve assembly 530-2. Likewise, the channels from the pipe 529 at the input of valve assembly 530-1 to single line unit 560-1, single line unit 560-3, and single line unit 560-4 are blocked by the shuttle valves 540.

Figure 6:
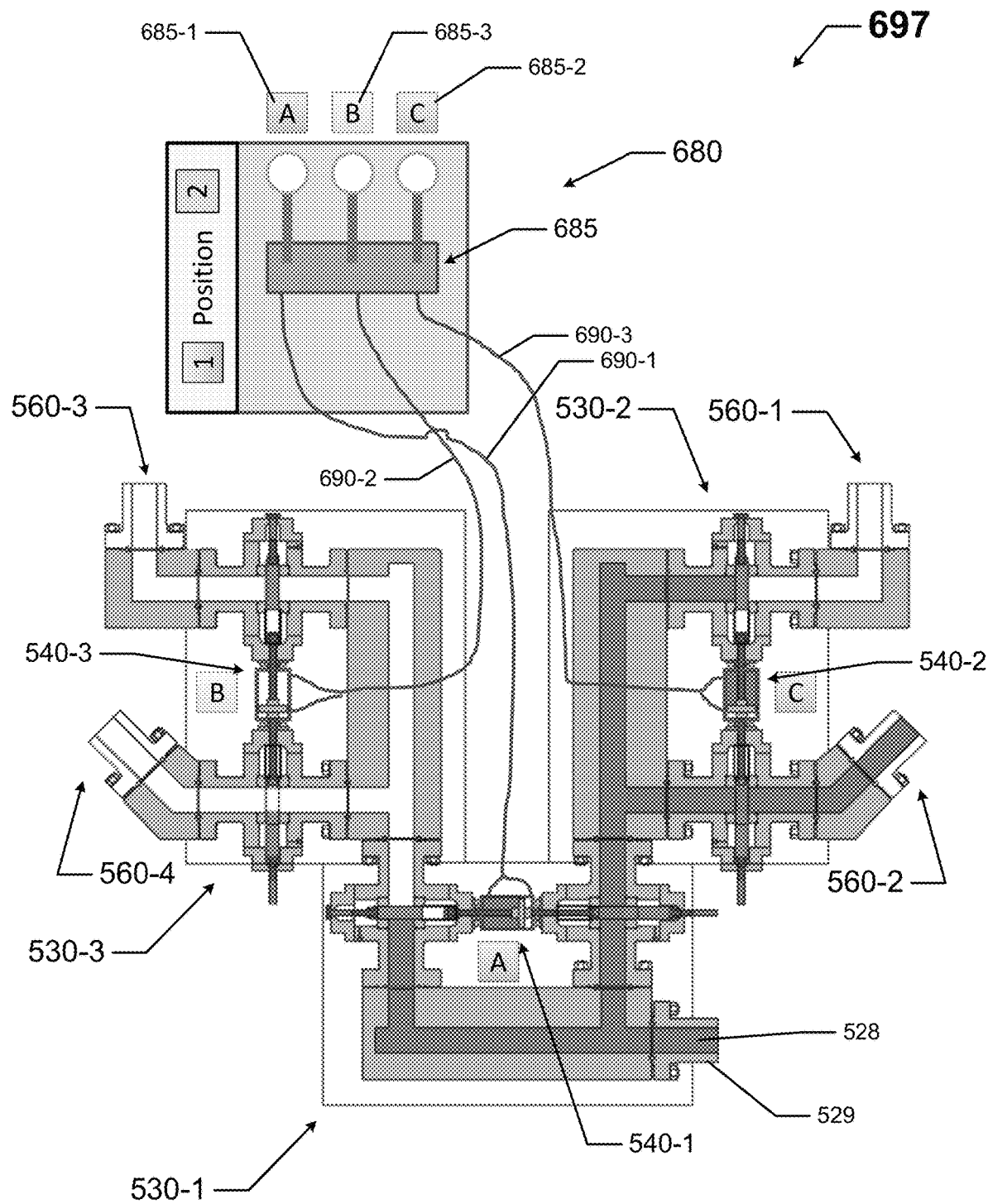
FIGS. 6-9 show an example of yet another fracturing manifold subsystem for fracturing a multi-well field that includes multiple shuttle valves in accordance with certain example embodiments.
Figure 7:
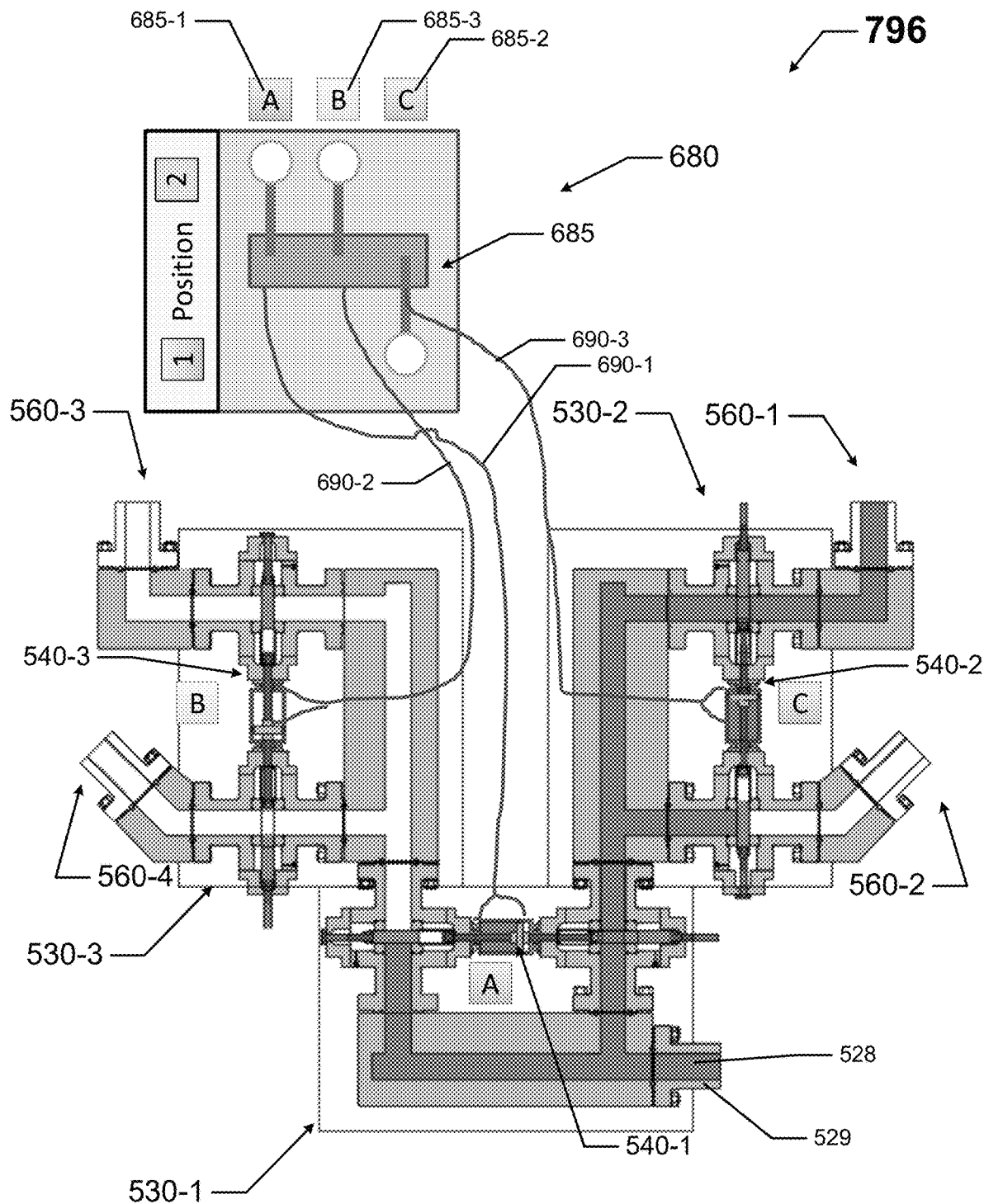
Figure 8:
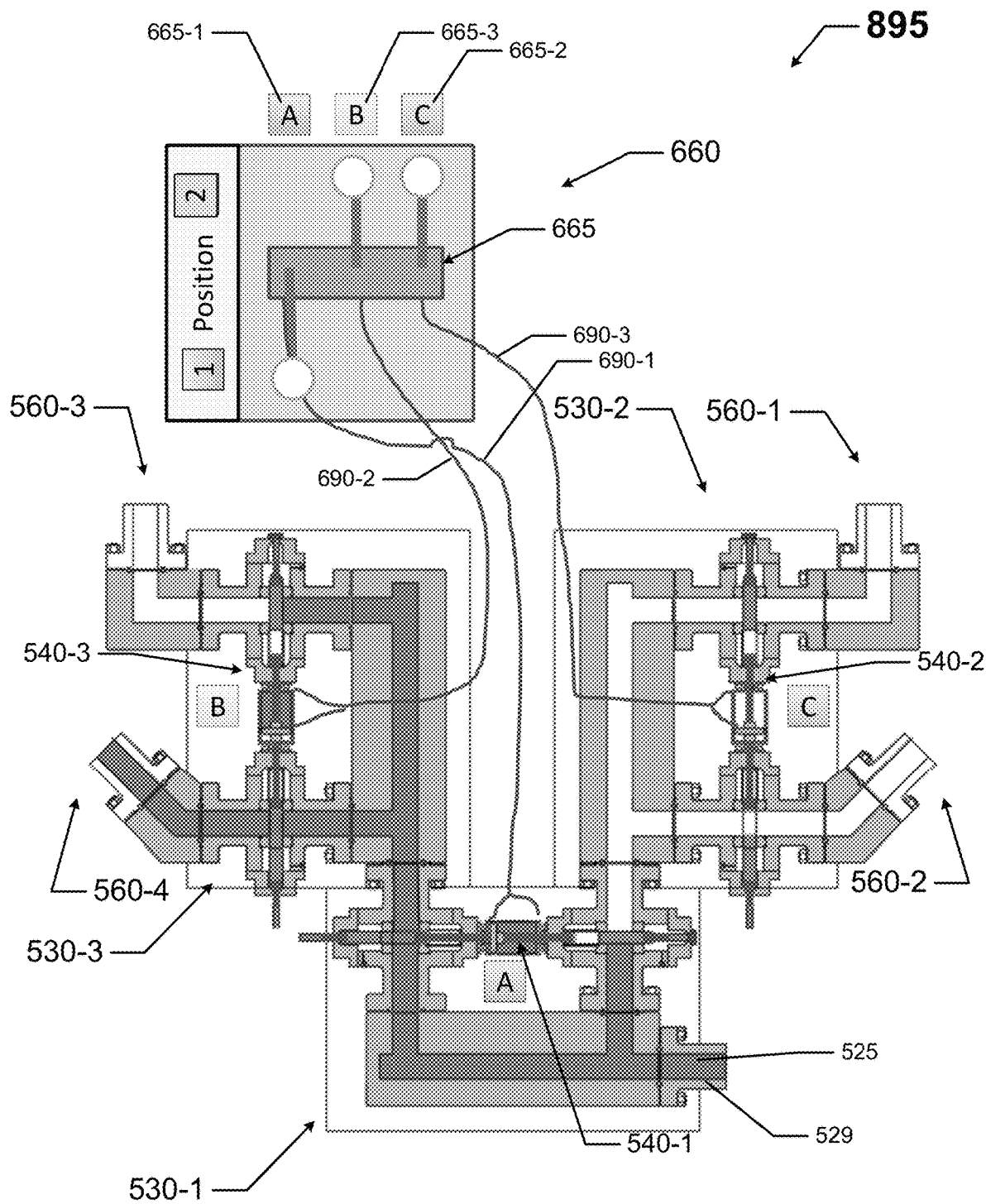
Figure 9:
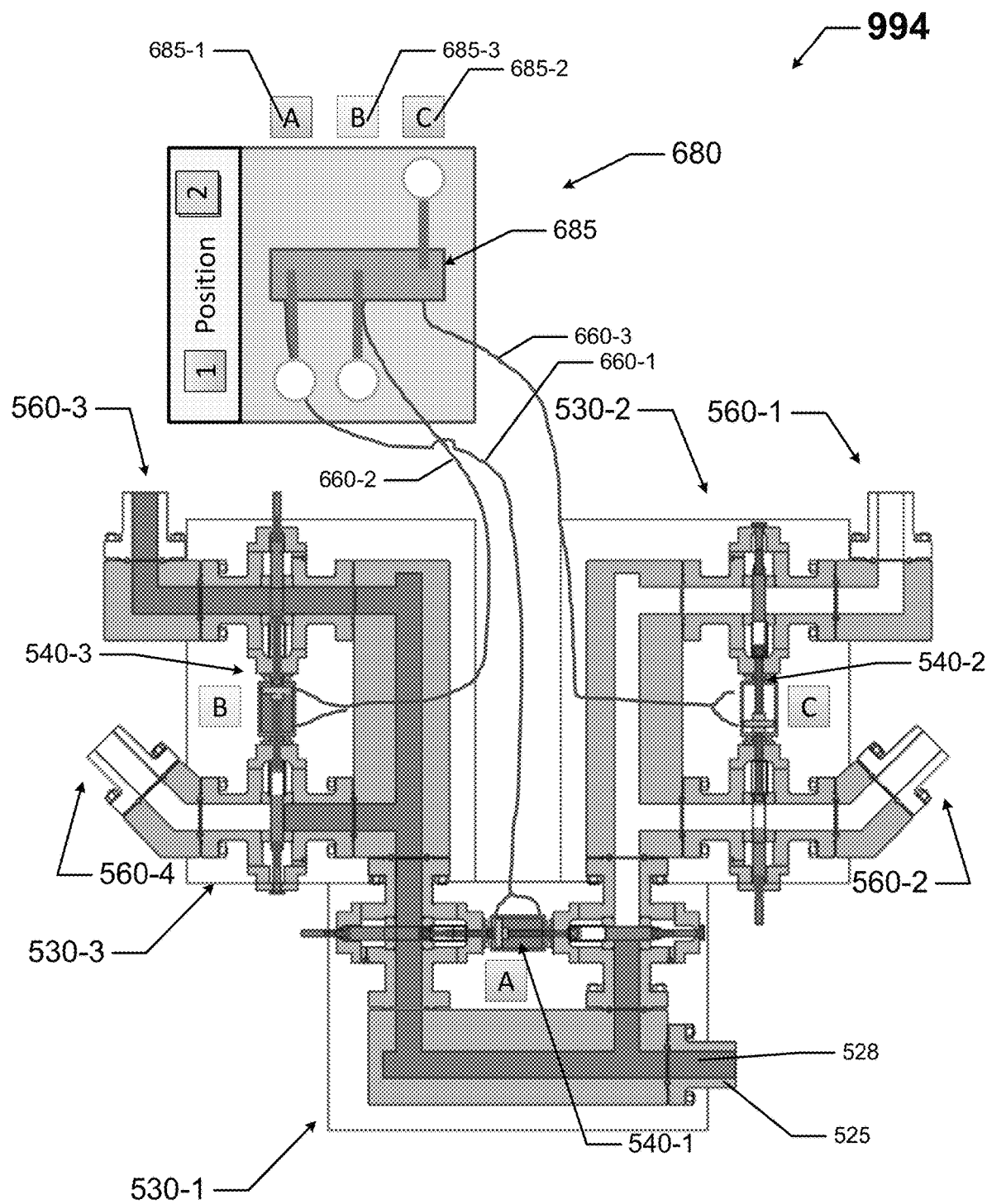

FIGS. 6-9 show an example of yet another fracturing manifold subsystem (part of a fracturing pad, such as fracturing pad 205 of FIG. 2) for fracturing a multi-well field that includes multiple shuttle valves in accordance with certain example embodiments. The subsystems of FIGS. 6-9 includes the valve assemblies 530 of FIG. 5. FIG. 6 shows a subsystem 697 in which the shuttle valves 540 of the three valve assemblies 530 are in a first configuration. FIG. 7 shows a subsystem 796 in which the shuttle valves 540 of the three valve assemblies 530 of FIG. 6 are in a second configuration. FIG. 8 shows a subsystem 895 in which the shuttle valves 540 of the three valve assemblies 530 of FIG. 6 are in a third configuration. FIG. 9 shows a subsystem 994 in which the shuttle valves 540 of the three valve assemblies 530 of FIG. 6 are in a fourth configuration.

Referring to FIGS. 1-9, the subsystem 697 of FIG. 6 has three valve assemblies 530 (valve assembly 530-1, valve assembly 530-2, and valve assembly 530-3) coupled to each other in a tiered configuration. Each valve assembly 530 of FIG. 6 is substantially the same as the valve assembly 330 described above with respect to FIG. 3. For example, valve assembly 530-1 includes a shuttle valve 540-1, valve assembly 530-2 includes a shuttle valve 540-2, and valve assembly 530-3 includes a shuttle valve 540-3.

The input of valve assembly 530-1 is directly coupled to a pipe 529 that leads to a fracturing pump (e.g., fracturing pump 210). One output of valve assembly 530-1 is directly coupled to the input of valve assembly 530-2, while the other output of valve assembly 530-1 is directly coupled to the input of valve assembly 530-3. The two outputs of valve assembly 530-2 feed two wells, and the two outputs of valve assembly 530-3 feed another two wells. Specifically, the two outputs of valve assembly 530-2 are coupled to single line unit 560-1 and single line unit 560-2, which in turn are each coupled to a fracturing tree for each respective well. Further, the two outputs of valve assembly 530-3 are coupled to single line unit 560-3 and single line unit 560-4, which in turn are each coupled to a fracturing tree for each respective well.

The subsystem 697 of FIG. 6 also includes a controller 680 and a number of control links 690 between the controller 680 and the various actuators of the shuttle valves 540. Specifically, control link 690-1 runs between the controller 680 and the actuator of shuttle valve 540-1. Control link 690-2 runs between the controller 680 and the actuator of shuttle valve 540-2. Control link 690-3 runs between the controller 680 and the actuator of shuttle valve 540-3. The control links 690 can be hydraulic lines (as for pneumatic actuation). Alternatively, the control links 690 can be electrical cables. As another alternative, the control links 690 can be air lines (as for compressed air).

The controller 690 can include one or more of any number of components. For example, as shown in FIG. 6, the controller 690 can include a number (in this case, three) of switches 685. Under the configuration of FIG. 6, switch 685-1 controls the actuator of shuttle valve 540-1, switch 685-2 controls the actuator of shuttle valve 540-2, and switch 685-3 controls the actuator of shuttle valve 540-3. In this case, each switch 685 has two positions: Position 1 and position 2. Under the configuration of FIG. 6, all three switches 685 are in position 2. While the switches 685 shown in FIG. 6 appear as manual switches, such switches 685 can be any other type of switch, including but not limited to software and hardware-driven.

Other components of the controller 690 can include, but are not limited to, a control engine, a communications module, a storage repository, a hardware processor, an integrated circuit, a power module, memory, a security module, a transceiver, and an application interface. The controller 690 can be dedicated to the operation of the actuators of the shuttle valves 540 in the subsystem 697. Alternatively, the controller 690 can be part of a larger control system for the fracturing operation.

Based on the configuration of the shuttle valves 540 shown in FIG. 6, there is an open path through the channel leading from the pipe 529 at the input of valve assembly 530-1 to the single line unit 560-2 at one of the outputs of valve assembly 530-2. Likewise, the channels from the pipe 529 at the input of valve assembly 530-1 to single line unit 560-1, single line unit 560-3, and single line unit 560-4 are blocked by the shuttle valves 540.

In the subsystem 796 of FIG. 7, switch 685-2 is changed from position 2 to position 1, causing the actuator of shuttle valve 540-2 to change position causing the actuator of shuttle valve 540-2 to change position relative to FIG. 6. Switch 685-1 and switch 685-3 remain in position 2. As a result of the configuration of the switches 685 in FIG. 7, and the resulting configuration of the shuttle valves 540, there is an open path through the channel leading from the pipe 529 at the input of valve assembly 530-1 to the single line unit 560-1 at one of the outputs of valve assembly 530-2. Likewise, the channels from the pipe 529 at the input of valve assembly 530-1 to single line unit 560-2, single line unit 560-3, and single line unit 560-4 are blocked by the shuttle valves 540.

In the subsystem 895 of FIG. 8, switch 685-1 is changed from position 2 to position 1, causing the actuator of shuttle valve 540-1 to change position relative to FIG. 7. Also, switch 685-2 is returned to position 2 from position 1, causing the actuator of shuttle valve 540-2 to change position relative to FIG. 7. Switch 685-3 remains in position 2. As a result of the configuration of the switches 685 in FIG. 8, and the resulting configuration of the shuttle valves 540, there is an open path through the channel leading from the pipe 529 at the input of valve assembly 530-1 to the single line unit 560-4 at one of the outputs of valve assembly 530-3. Likewise, the channels from the pipe 529 at the input of valve assembly 530-1 to single line unit 560-1, single line unit 560-2, and single line unit 560-3 are blocked by the shuttle valves 540.

In the subsystem 994 of FIG. 9, switch 685-3 is changed from position 2 to position 1, causing the actuator of shuttle valve 540-3 to change position relative to FIG. 8. Switch 685-1 remains in position 1, and switch 685-2 remains in position 2. As a result of the configuration of the switches 685 in FIG. 9, and the resulting configuration of the shuttle valves 540, there is an open path through the channel leading from the pipe 529 at the input of valve assembly 530-1 to the single line unit 560-3 at one of the outputs of valve assembly 530-3. Likewise, the channels from the pipe 529 at the input of valve assembly 530-1 to single line unit 560-1, single line unit 560-2, and single line unit 560-4 are blocked by the shuttle valves 540.

Figure 10:
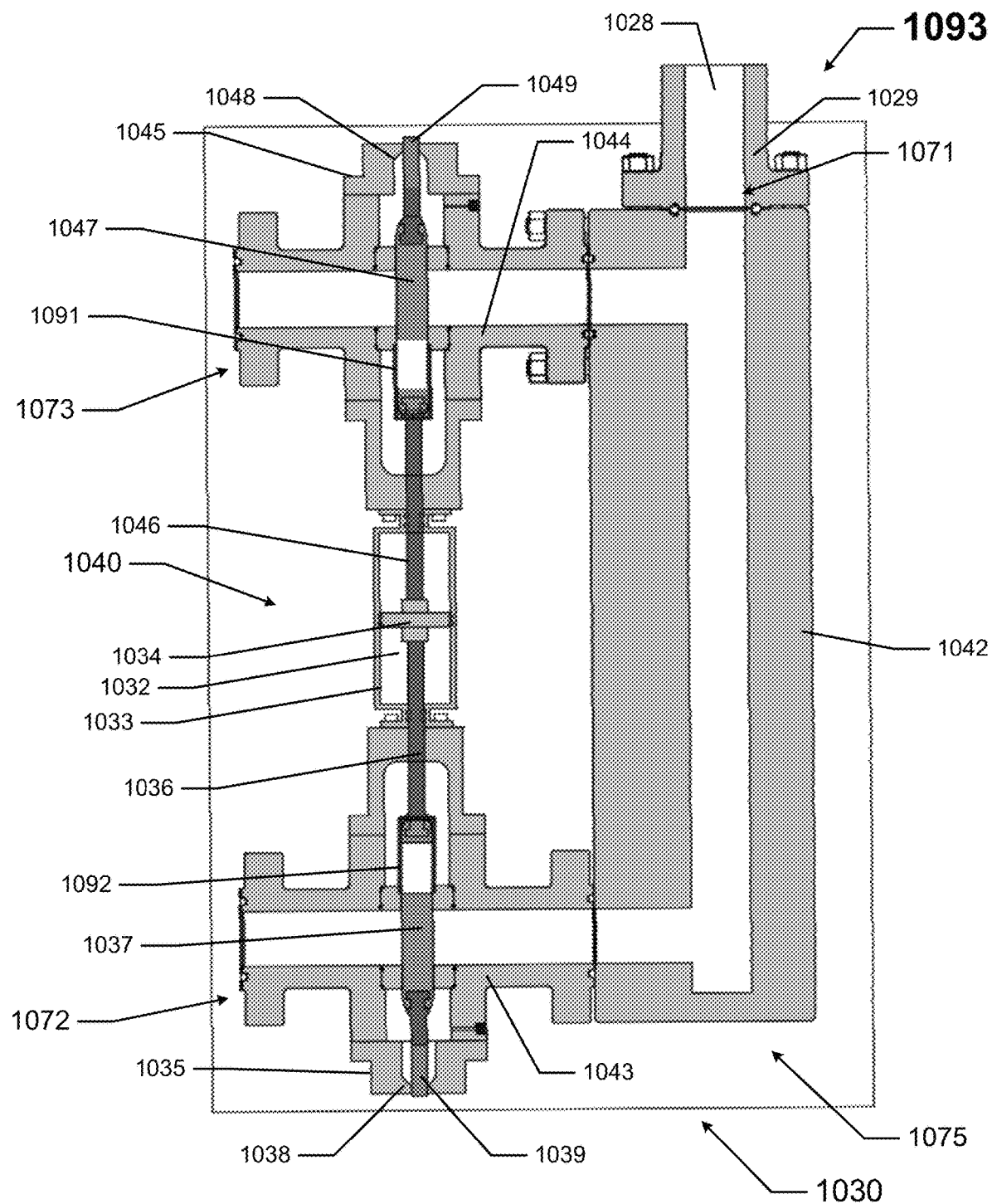
FIG. 10 shows a fracturing manifold subsystem for fracturing a multi-well field that includes a 3-position shuttle valve in accordance with certain example embodiments.

FIG. 10 shows a fracturing manifold subsystem 1093 (part of a fracturing pad, such as fracturing pad 205 of FIG. 2) for fracturing a multi-well field that includes a 3-position shuttle valve in accordance with certain example embodiments. Referring to FIGS. 1-10, the subsystem 1093 of FIG. 10 is substantially the same as the subsystem 399 of FIG. 3, except as described below. For example, the subsystem 1093 of FIG. 10 includes a valve assembly 1030 having a shuttle valve 1040, an inlet 1071 and two outlets (outlet 1072 and outlet 1073). The valve assembly 1030 has a body 1075 that can be made from one or more pieces. In this case, the body 1075 of the valve assembly 1030 is made from 3 pieces that are coupled (e.g., bolted) to each other. Further, the body 1075 of the valve assembly 1030 can have any of a number of configurations. For example, in this case, the body 1075 of the valve assembly 1030 forms a U-shape.

Piece 1042 of the body 1075 of the valve assembly 1030 acts as a type of header (the base of the U-shape). Piece 1043 and piece 1044 are configured identically with respect to each other and act as the legs of the U-shape of the body 1075. As such, piece 1043 is coupled to one end of piece 1042, and piece 1044 is coupled to the other end of piece 1042. There is a channel 1028 that runs through the middle of the body 1075 and its various pieces (piece 1042, piece 1043, piece 1044).

The inlet 1071 of the valve assembly 1030 is part of piece 1042 and forms a first end of the channel 1028 disposed in the body 1075 of the valve assembly 1030. The outlet 1072 of the valve assembly 1030 is part of piece 1043 and forms a second end of the channel 1028 disposed in the body 1075 of the valve assembly 1030. The outlet 1073 of the valve assembly 1030 is part of piece 1044 and forms a third end of the channel 1028 disposed in the body 1075 of the valve assembly 1030.

The shuttle valve 1040 in this case is disposed within and between piece 1043 and piece 1044 of the body 1075 of the valve assembly 1030. The shuttle valve 1040 includes an actuator 1034, a valve stem 1037 coupled to one end of the actuator 1034, and another valve stem 1047 coupled to the opposite end of the actuator 1034. The actuator 1034 is movably disposed within a cavity 1032 formed by an actuator housing 1033. Specifically, the actuator 1034 moves (shuttles) between either end of the actuator housing 1033. In some cases, there is one or more sealing devices 1095 (e.g., o-ring, gasket) disposed around the actuator 1034. The actuator 1034 can move within the actuator housing 1033 electrically, pneumatically, magnetically, and/or by some other means (e.g. compressed air).

Directly coupled to each end of the actuator 1034 is an extension. Specifically, extension 1036 is directly coupled to one end of the actuator 1034, and extension 1046 is directly coupled to the other end of the actuator 1034. Extension 1036 is, in turn, directly coupled to valve stem 1037, and extension 1046 is, in turn, directly coupled to valve stem 1047. Valve stem 1037 has an aperture 1092 that traverses through a portion of the valve stem 1037, and valve stem 1047 has an aperture 1091 that traverses through a portion of the valve stem 1047.

The aperture 1092 in the valve stem 1037 and the aperture 1091 in the valve stem 1047 can have a number of shapes and sizes. For example, aperture 1092 and aperture 1091 can be substantially the same shape and size as the channel 1028 in the body 1075 of the valve assembly 1030. In this case, the shuttle valve 1040 of FIG. 10 is a 3-way valve. When the actuator 1034 abuts against one end of the actuator housing 1033, one valve stem (e.g., valve stem 1037) can be disposed in the channel 1028, thereby completely blocking the channel 1028 between the inlet 1071 and the corresponding outlet (e.g., outlet 1072), while the aperture (e.g., aperture 1091) of the other valve stem (e.g., valve stem 1047) can be disposed in the channel 1028, thereby allowing a continuous path along the channel 1028 between the inlet 1071 and the corresponding outlet (e.g., outlet 1073).

Conversely, when the actuator 1034 abuts against the other end of the actuator housing 1033, the valve stem (e.g., valve stem 1037) that was disposed in the channel 1028 now has its aperture (e.g., aperture 1092) disposed in the channel 328, thereby allowing a continuous path along the channel 1028 between the inlet 1071 and the corresponding outlet (e.g., outlet 1072), while the other valve stem (e.g., valve stem 1047) becomes disposed in the channel 1028, thereby completely blocking the channel 1028 between the inlet 1071 and the corresponding outlet (e.g., outlet 1073).

When the actuator 1034 is positioned in the approximate center of the actuator housing 1033 (a third position that is not available for the shuttle valve 340 of FIG. 3), as shown in FIG. 10, both valve stems (valve stem 1037 and valve stem 1047) are disposed in the channel 1028, thereby completely blocking the channel 1028 between the inlet 1071 and both outlets (outlet 1072 and outlet 1073) of the valve assembly 1030. In other words, when the actuator 1034 is positioned in the middle of the actuator housing 1033, no fluids flow through the channels 1028 to outlet 1072 or outlet 1073.

Regardless of the position of the actuator 1034 (and so also the shuttle valve 1030), the distal end of each valve stem (in this case, valve stem 1037 and valve stem 1047) extends beyond the channel 1028. Attached to the distal end of valve stem 1037 is a valve position indicator 1039, and attached to the distal end of valve stem 1047 is a valve position indicator 1049. Valve position indicator 1039 is designed to protrude through an aperture in an end cap 1035 coupled to piece 1043 when the aperture 1092 of the valve stem 1037 is disposed in the channel 1028, allowing a continuous path between inlet 1071 and outlet 1072. In other words, when the valve position indicator 1039 is visible, a user has a visual confirmation that the valve stem 1037 is open along that channel 1028. When the valve position indicator 1039 is hidden within the end cap 1035, as shown in FIG. 10, this indicates that the valve stem 1037 is blocking the channel 1028 between the inlet 1071 and outlet 1072.

Similarly, as shown in FIG. 10, valve position indicator 1049 is designed to protrude through an aperture in an end cap 1045 coupled to piece 1044 when the aperture 1091 of the valve stem 1047 is disposed in the channel 1028, allowing a continuous path between inlet 1071 and outlet 1073. In other words, when the valve position indicator 1049 is visible, a user has a visual confirmation that the valve stem 1047 is open along that channel 1028. When the valve position indicator 1049 is hidden within the end cap 1035, this indicates that the valve stem 1047 is blocking the channel 1028 between the inlet 1071 and outlet 1073.

The end cap 1035 can have an inner surface 1038 that complements the shape and size of the distal end of the valve stem 1037. Under this arrangement, the end cap 1035 can act as a stop for the valve stem 1037 so that the aperture 1092 of the valve stem 1037 can be properly centered in the channel 1028. Similarly, the end cap 1045 can have an inner surface 1048 that complements the shape and size of the distal end of the valve stem 1047, as shown in FIG. 10. Under this arrangement, the end cap 1045 can act as a stop for the valve stem 1047 so that the aperture 1091 of the valve stem 1047 can be properly centered in the channel 1028.

Figure 11:
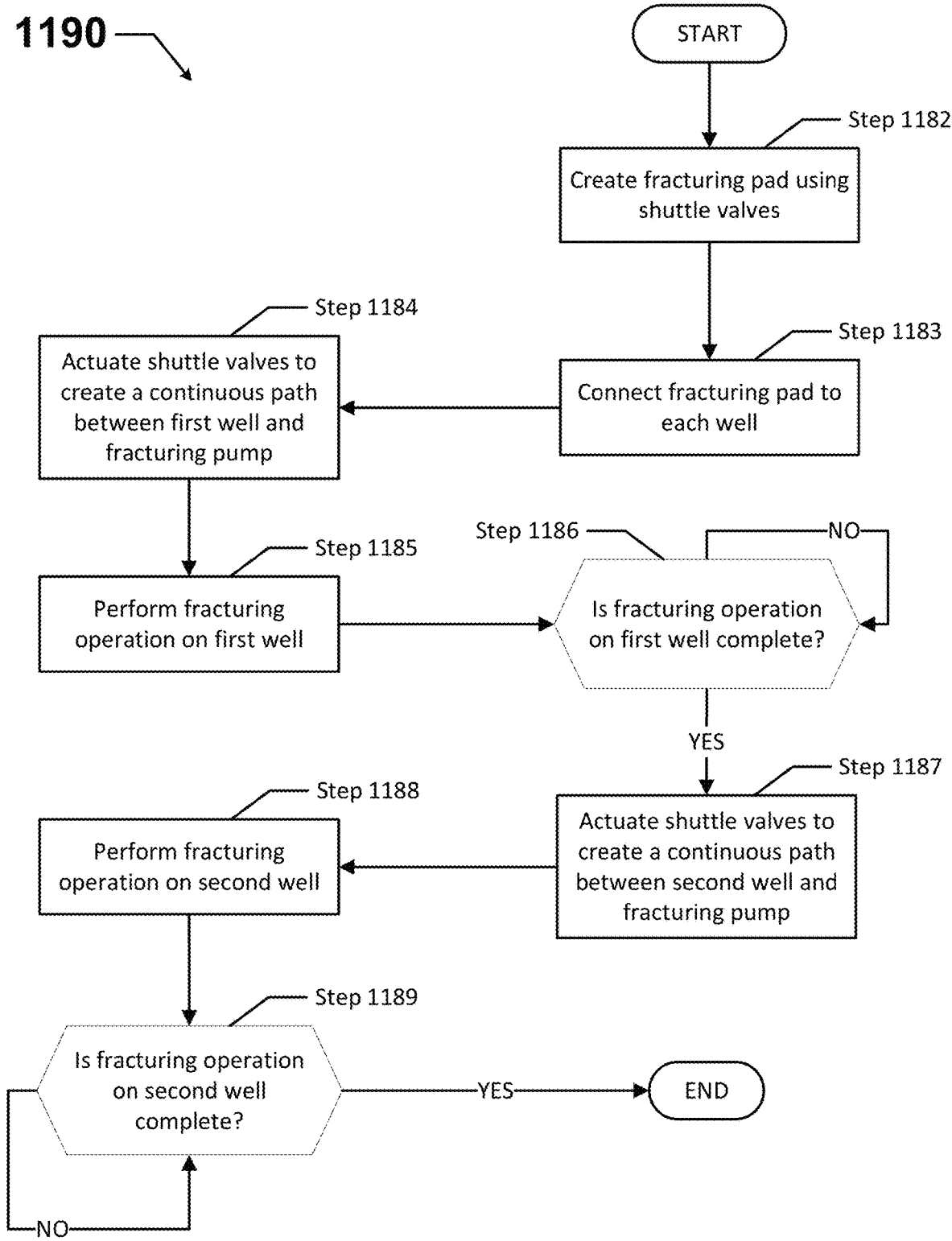
FIG. 11 is a flow chart of a method for fracturing of a multi-well field in accordance with the example embodiments of the present disclosure.

FIG. 11 is a flow chart of a method 1090 for fracturing of a multi-well field in accordance with the example embodiments of the present disclosure. While the various steps in this flow chart are presented and described sequentially, one of ordinary skill in the art will appreciate that some or all of the steps can be executed in different orders, combined or omitted, and some or all of the steps can be executed in parallel depending upon the example embodiment. Further, in one or more of the example embodiments, one or more of the steps described below can be omitted, repeated, and/or performed in a different order. For example, the process of optimizing a water heating system can be a continuous process, and so the START and END steps shown in FIG. 6 can merely denote the start and end of a particular series of steps within a continuous process.

In addition, a person of ordinary skill in the art will appreciate that additional steps not shown in FIG. 11 can be included in performing these methods in certain example embodiments. Accordingly, the specific arrangement of steps should not be construed as limiting the scope. In addition, a particular computing device can be used to perform one or more of the steps for the methods described below in certain example embodiments.

Referring to FIGS. 1-11, the example method 790 of FIG. 11 begins at the START step and proceeds to step 1182, where a fracturing pad 205 is created using one or more shuttle valves 540. Specifically, the fracturing pad 205 that is created includes one or more valve assemblies 530, where each valve assembly 530 includes a shuttle valve 540. The fracturing pad 205 can also include one or more of a number of other components. Examples of such other components can include, but are not limited to, a fracturing pump 210, a fracturing iron 455, a single line unit 560, a fracturing tree 221, a controller 660, control links 690, and pipes 229.

In step 1183, the fracturing pad 205 is connected to each well 220. Specifically, a component (e.g., a fracturing tree 221) of the fracturing pad 205 is connected to the wellbore 222 of each well 220. In step 1184, one or more of the shuttle valves 540 of the valves assemblies 530 are actuated (operated) to create a continuous path between the fracturing pump 210 and one of the wells 220 (e.g., 220-1). When this occurs, the configuration of the shuttle valves 540 of the valve assemblies 530 of the fracturing pad 205 causes the remainder of the wells 220 to be physically cut off from the fracturing pump 210, completely isolating the single well 220-1 that is about to be fractured. The configuration of the shuttle valves 540 can be visually confirmed by the appearance of valve position indicators 349.

In step 1185, a fracturing operation is performed on the first well 220-1. The fracturing operation can include operating the fracturing pump 210 and transmitting fluid through the continuous path of the fracturing pad 205 (formed by the configuration of the shuttle valves 540) to the well 220-1. In step 1186, a determination is made as to whether the fracturing operation on the first well 220-1 is complete. If the fracturing operation on the first well 220-1 is not complete, then process repeats in a closed loop in step 1186. If the fracturing operation on the first well 220-1 is complete, then the process proceeds to step 1187.

In step 1187, one or more of the shuttle valves 540 of the valves assemblies 530 are actuated (operated) to create a continuous path between the fracturing pump 210 and another one of the wells 220 (e.g., 220-2). When this occurs, the configuration of the shuttle valves 540 of the valve assemblies 530 of the fracturing pad 205 causes the remainder of the wells 220 to be physically cut off from the fracturing pump 210, completely isolating the single well 220-2 that is about to be fractured. The configuration of the shuttle valves 540 can be visually confirmed by the appearance of valve position indicators 349.

In step 1188, a fracturing operation is performed on the second well 220-2. The fracturing operation can include operating the fracturing pump 210 and transmitting fluid through the continuous path of the fracturing pad 205 (formed by the configuration of the shuttle valves 540) to the well 220-2. In step 1189, a determination is made as to whether the fracturing operation on the second well 220-2 is complete. If the fracturing operation on the second well 220-2 is not complete, then the process repeats in a closed loop in step 1189. If the fracturing operation on the second well 220-2 is complete, then the process proceeds to the END step. Alternatively, the process can revert to step 1187 for another well 220 (e.g., a third well 220-3).

Example embodiments can allow for more safe, reliable, and efficient fracturing operations of a multi-well field. Example embodiments can provide a visual confirmation as to a configuration of multiple shuttle valves so that a user knows, before beginning a fracturing operation, that a single, targeted well is isolated for, and that the remainder of the well are closed off from, the fracturing operation.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A multi-well fracturing pad for fracturing a subterranean formation, the multi-well pad comprising:

a first valve assembly comprising a first shuttle valve, a first inlet, a first outlet, and a second outlet, wherein the first inlet is coupled to a fracturing pump, wherein the first outlet is coupled to a first well, wherein the second outlet is coupled to a second well, wherein the first shuttle valve has a first position and a second position, wherein the fracturing pump and the first well form a continuous first path through the first valve assembly when the first shuttle valve is in the first position, wherein the fracturing pump and the second well are closed off from each other by the first shuttle valve when the first shuttle valve is in the first position, wherein the fracturing pump and the second well form a continuous second path through the first valve assembly when the first shuttle valve is in the second position, and wherein the fracturing pump and the first well are closed off from each other by the first shuttle valve when the first shuttle valve is in the second position.

2. The multi-well fracturing pad of claim 1, further comprising:

a second valve assembly comprising a second shuttle valve, a second inlet, a third outlet, and a fourth outlet, wherein the second inlet is coupled to the first outlet of the first valve assembly, wherein the third outlet is coupled to the first well, wherein the fourth outlet is coupled to a third well, wherein the second shuttle valve has the first position and the second position, wherein the first outlet of the first valve assembly and the first well form a continuous third path through the second valve assembly when the second shuttle valve is in the third position, wherein the first outlet of the first valve assembly and the third well are closed off from each other by the second shuttle valve when the second shuttle valve is in the third position, wherein the first outlet of the second valve assembly and the third well form a continuous fourth path through the second valve assembly when the second shuttle valve is in the fourth position, and wherein the first outlet of the first valve assembly and the first well are closed off from each other by the second shuttle valve when the second shuttle valve is in the fourth position.

3. The multi-well fracturing pad of claim 2, wherein the first valve assembly and the second valve assembly are located above a surface, wherein the first well and the second well begin at the surface.

4. The multi-well fracturing pad of claim 1, wherein the first shuttle valve is a full bore shuttle valve.

5. The multi-well fracturing pad of claim 4, wherein the first shuttle valve is operated between the first position and the second position pneumatically.

6. The multi-well fracturing pad of claim 4, wherein the first shuttle valve comprises an actuator, a first valve stem coupled to a first end of the actuator, and a second valve stem coupled to a second end of the actuator, wherein movement of the actuator corresponds to the first position and the second position of the first shuttle valve.

7. The multi-well fracturing pad of claim 6, wherein the first valve stem comprises a first aperture that traverses therethrough and a first solid portion adjacent to the first aperture, wherein the second valve stem comprises a second aperture that traverses therethrough and a second solid portion adjacent to the second aperture, wherein the first aperture of the first valve stem is disposed in a first channel within the first valve assembly when the first shuttle valve is in the first position, wherein the second solid portion of the second valve stem is disposed in and blocks a second channel within the first valve assembly when the first shuttle valve is in the first position, wherein the second aperture of the second valve stem is disposed in the second channel within the first valve assembly when the first shuttle valve is in the second position, and wherein the first solid portion of the first valve stem is disposed in and blocks the first channel within the first valve assembly when the first shuttle valve is in the second position.

8. The multi-well fracturing pad of claim 7, wherein the first valve stem further comprises a first valve position indicator, wherein the second valve stem further comprises a second valve position indicator, wherein the first valve position indicator indicates whether the first channel within the first valve assembly is open through the first shuttle valve, and wherein the second valve position indicator indicates whether the second channel within the first valve assembly is open through the first valve.

9. The multi-well fracturing pad of claim 8, wherein the first valve stem further comprises a first lockout feature that prevents the first valve stem from being moved by the actuator.

10. The multi-well fracturing pad of claim 9, wherein the first lockout feature holds the first valve stem in place so that the first valve stem blocks the first channel within the first valve assembly.

11. The multi-well fracturing pad of claim 1, wherein the first shuttle valve of the first valve assembly further has a third position, wherein the fracturing pump is closed off from the first well and the second well when the first shuttle valve is in the third position.

12. The multi-well fracturing pad of claim 1, wherein a first number of valve assemblies is less than a second number of wells.

13. The multi-wall fracturing pad of claim 1, further comprising:

a controller communicably coupled to the first valve assembly, wherein the controller operates the first shuttle valve between the first position and the second position.

14. The multi-well fracturing pad of claim 13, wherein the controller only operates the first shuttle valve when the fracturing pump is idle.

15. A method for fracturing a subterranean formation using a multi-well fracturing pad, the method comprising:

operating, prior to fracturing a first well, at least one shuttle valve of the multi-well pad to form a first configuration, wherein the first configuration of the at least one shuttle valve forms a continuous first path between a fracturing pump and the first well while closing off the fracturing pump from a first reminder of wells; and operating, after fracturing the first well and prior to fracturing a second well, the at least one shuttle valve of the multi-well pad to form a second configuration, wherein the second configuration of the at least one shuttle valve forms a continuous second path between a fracturing pump and the second well while closing off the fracturing pump from a second reminder of wells.

16. The method of claim 15, wherein operating the at least one shuttle valve involves pneumatic equipment.

17. The method of claim 15, wherein operating the at least one shuttle valve is prevented while the fracturing pump is operating.

18. The method of claim 15, further comprising:
applying a lock out mechanism to the at least one shuttle valve to prevent the at least one shuttle valve from changing position to a different configuration.

19. The method of claim 15, further comprising:
providing visual indication of a position of the at least one shuttle valve in the first configuration.

20. The method of claim 15, wherein the at least one shuttle valve comprises a tiered array of shuttle valves.

* * * * *